US009235020B2

United States Patent
Pitwon

(10) Patent No.: US 9,235,020 B2
(45) Date of Patent: Jan. 12, 2016

(54) STORAGE DEVICE, A STORAGE OR TEST SYSTEM AND A METHOD OF MOUNTING A STORAGE DEVICE

(71) Applicant: Seagate Technology LLC, on behalf of Xyratex Technology Limited—a Seagate Company, Cupertino, CA (US)

(72) Inventor: Richard Charles Alexander Pitwon, Fareham (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/875,948

(22) Filed: May 2, 2013

(65) Prior Publication Data

US 2014/0328562 A1  Nov. 6, 2014

(51) Int. Cl.
*G02B 6/36* (2006.01)
*G02B 6/42* (2006.01)
*H01F 38/14* (2006.01)

(52) U.S. Cl.
CPC .............. *G02B 6/4293* (2013.01); *H01F 38/14* (2013.01)

(58) Field of Classification Search
CPC .............................. H01F 38/14; G02B 6/4293
USPC .......................................................... 439/950
See application file for complete search history.

(56) References Cited

U.S. PATENT DOCUMENTS

| 5,734,254 | A | 3/1998 | Stephens |
| 6,175,124 | B1 * | 1/2001 | Cole et al. ................... 257/48 |
| 6,957,351 | B2 * | 10/2005 | Emberty et al. ............. 713/300 |
| 7,260,423 | B2 * | 8/2007 | Richardson et al. .......... 455/572 |

| 2004/0088456 | A1 | 5/2004 | Zhang |
| 2006/0023330 | A1 | 2/2006 | Matsui |
| 2006/0072241 | A1 | 4/2006 | Feliss et al. |
| 2007/0032890 | A1 | 2/2007 | Zhou et al. |
| 2007/0273486 | A1 | 11/2007 | Shiotsu et al. |
| 2008/0079396 | A1 | 4/2008 | Yamazaki et al. |
| 2012/0194127 | A1 | 8/2012 | Kobayashi et al. |

FOREIGN PATENT DOCUMENTS

| EP | 1775864 A1 | 4/2007 |
| JP | H09285042 A | 10/1997 |
| TW | I253018 | 4/2006 |
| WO | 2010-124165 A1 | 10/2010 |

OTHER PUBLICATIONS

Peter A. Masterson, "Damping Effects on Shock Response Spectra—Part 3: 1-inch Disk Drives," E-A-R Specialty Composites, Indianapolis, Indiana, p. 1-7 (2005).
Combined Search and Examination Report issued in GB Application No. 1407658.2, mailed Oct. 10, 2014, 8 pages.

* cited by examiner

*Primary Examiner* — Omar R Rojas
(74) *Attorney, Agent, or Firm* — HolzerIPLaw, PC

(57) ABSTRACT

An electro-optical connector assembly includes a first data connector for arrangement on a first device and a second data connector for arrangement on a second device, the first and second data connectors being for communicating data through free space between the first device and the second device and, a first power connector for arrangement on the first device and a second power connector for arrangement on the second device, the first and second power connectors being for providing wireless power transfer between the first device and the second device.

31 Claims, 10 Drawing Sheets

STORAGE DEVICE, A STORAGE OR TEST SYSTEM AND A METHOD OF MOUNTING A STORAGE DEVICE

BACKGROUND

The present invention relates to a storage device, a storage or test system and a method of mounting a storage device or electronic device.

Data storage systems are known. Typically a data storage system comprises plural storage media such as hard disk drives (HDDs) arranged within a drawer or blade based system. In a high density drawer based server storage enclosure, such as the OneStor™ AP-2584 system or other such systems provided by the present assignee, plural drives are arranged in a drawer, each coupled to a midplane. At the back of the drawer, i.e. on the reverse side of the midplane, control units are provided. The drawer may be arranged to receive one or more controllers, input/output units and power supplies at the back coupled via the midplane to the plural disk drives.

As required data capacities increase there is a need and desire to increase the density and/or number of disk drives within a drawer or disk array enclosure based storage system. This is achievable by careful use and organisation of disk drives within each drawer or system so as to achieve a maximum or optimal packing density.

A problem that is encountered in storage systems such as these, particularly where the density of disk drives is being maximised is the transmission of vibrations from one disk drive to another and/or to the storage system at large and the transmission of vibrations to one disk drive from another and/or from the storage system at large. In particular as disk drives rotate and the read/write head within the disk drive moves to enable writing to or reading from the disk drive platter, vibrations are generated. The simple spinning motion of the disk within the disk drive housing as well as the movement of the actuator for the read/write head arm can be a significant source of vibrations. The transfer of vibration between individual disk drives is undesirable and so some means for vibrationally isolating, or at least reducing vibrational coupling, is desired.

This is also a problem in disk drive or storage media test systems, used to test storage media or disk drives during manufacture. In fact, during testing it can be even more important to be able to vibrationally isolate a storage medium or disk drive.

The damping of vibration from and to spinning drives has been explored by Xyratex for many years and given rise to a number of innovations. The most recent of these is the use of a vibration damping material developed by 3M known as EAR, described in more detail below. This material has been shown to be very effective at damping vibrational energy and thus is expected to prevent or reduce vibrational energy transfer between the drive and its carrier (and subsequently the system with which the carrier is in mechanical contact).

However, although this may help, the most critical conduit of vibrational energy from the drive to the system to which the drive is connected and vice versa is through the electrical power and signal contacts and connector. Typically in modern data storage systems this would be a standard SAS/SATA type connector.

As of yet no solutions exist to provide complete mechanical isolation of the drive from the system to which it is connected, through the power and signal connections.

US-A-2006/0072241 discloses a sealed Hard Disk Drive filled with an inert gas mixture of air, helium, and/or nitrogen provides a wireless data encrypted interface to facilitate data and control transfer with a host system. The wireless interface additionally allows power transfer through Radio Frequency (RF) propagation or electromagnetic induction. Extended measures for vibration, shock, and temperature control are made possible through the use of the wireless interface. The teaching of the document relates to means by which HDDs, as they become used widely in mobile devices, can be housed in such a way as to provide physical safety to the device whilst enabling data and power transfer to and from the device.

Wireless data communication in general and in HDDs in particular is known. One example of its use in HDDs is TW-A-1,253,018 (Guan-Yu).

US-A-2007/273486 is another example of such a disclosure. This discloses a passive contactless information storage device capable of transmitting and receiving signals. A fixed-station information processing device is provided having an information processing unit, and a wireless transmitter for transmitting, in a contactless manner, a command signal for requesting transmission of information stored in the information storage device and supplying power in a contactless manner to the information storage device. A mobile-station information processing device is provided having an information processing unit, an information presenting unit, a battery, and a wireless receiver for receiving a response signal for response to the command signal, from the information storage device in a contactless manner. While the fixed-station device is supplying power to the information storage device in the contactless manner, the information storage device transmits, in response to the command signal, the response signal to the mobile-station device in the contactless manner.

US-A-2007/032890 discloses a system by which unwanted resonant dynamics can be suppressed within the arm of a HDD.

US-A-2008/0079396 discloses means by which the charging of a battery in a power storage device which includes the battery may be simplified. A wireless power storage device is provided which can transmit and receive information without the task of replacing a battery for drive power supply, which becomes necessary when the battery depletes over time, being performed. An antenna circuit, a battery which is electrically connected to the antenna circuit via a rectifier circuit, and a load portion which is electrically connected to the battery are provided. The battery is charged when an electromagnetic wave received by the antenna circuit is input to the battery via the rectifier circuit, and discharged when electrical power which has been charged is supplied to the load portion. The battery is charged cumulatively, and the battery is discharged in pulses.

SUMMARY

According to a first aspect of the present invention, there is provided an electro-optical connector assembly, wherein the connector assembly comprises a first data connector for arrangement on a first device and a second data connector for arrangement on a second device, the first and second data connectors being for communicating data through free space between said first device and said second device and, a first power connector for arrangement on said first device and a second power connector for arrangement on said second device, the first and second power connectors being for providing wireless power transfer between said first device and said second device.

An electro-optical connector assembly is provided that enables wireless power and data connectivity between two devices. Typically this would find use in a connector assembly for a hard disk drive within a storage system, or disk drive test system, and could be arranged such as to provide the connectivity between a hard disk drive (optionally in a carrier) and mid- or back plane within the storage system. By providing what is effectively a contactless connector, i.e. there is no direct physical contact between either the power transfer or data transfer connectors, the device such as a hard disk drive can be isolated from the vibrations that would otherwise pass to it from the mid- or back plane of the storage system. Furthermore it means that vibrations caused by the disk drive itself will not be communicated to the backplane and onwards to other components in the storage system. The disk drive would be substantially vibrationally isolated (or at least vibrationally insulated) from the storage system in which it is arranged.

As well as in disk drive systems, the present connector assembly would provide advantages in any modular application which would benefit from mechanically contactless power and data signal interfaces in which vibration isolation or reduction is desired. Examples include, but are not limited to, data storage controller or expander cards, server motherboards, and switch cards.

Preferably, the first and second power connectors each comprise an inductive power coupler coil.

The use of inductive power couplers enables a simple and reliable means for wireless transfer of power from one device to another.

Preferably, one or both of the first coupler coils has a shock absorbing material layer to engage with the other coupler coil. It is preferred that shock absorbing material be provided on one or both of the inductive power coupler coils. This means that the power coupler coils could provide some registration or alignment of the first device without there being any means for significant (or indeed any) transfer of vibration.

Preferably, the profile of the shock absorbing material is tapered to facilitate engagement of the first and second electro-optical connectors. By tapering the shock absorbing material it is possible to ensure that engagement is easily achieved when the power couplers are brought or pushed together.

Preferably, when the first and second coupler coils are engaged, there is a space between the coils including air. This ensures that there is no direct contact at all between the couplers on the first and second devices thereby meaning there can be no transfer of vibration between the devices via the couplers.

Preferably, the first coil is a male coil and the second coil is a female coil.

Preferably, the first and second data connectors are optical data couplers. This enables high bit rate communication in an efficient and compact manner.

Preferably, one or both of the optical data couplers comprises an optical waveguide terminating in a beam expander to generate an expanded output beam from the waveguide. By expanding the output beam it means that the registration or alignment required with a second device is easily achieved as the tolerance will be correspondingly larger.

Preferably, one or both of the optical data couplers comprises plural waveguides, each of which waveguides terminates in a beam expander to generate a corresponding expanded output beam from the waveguide.

Preferably, the plural beam expanders are provided by an integrated lens array.

Preferably, the integrated lens array comprises a geometric or GRIN microlens array.

Preferably, the electro-optical connector assembly comprises an optical engine having one or more optical sources for generating optical signals optically coupled to the or each of the data connectors.

Preferably, the electro-optical connector assembly comprises one or more waveguides each arranged to couple optical signals from the optical engine to an edge region of the connector assembly.

Preferably, the optical engine has one or more optical receivers for receiving optical signals from another connector.

Preferably, the electro-optical connector assembly comprises a static control line to indicate the presence of a second connector. As well as providing high bit rate optical communication, a simple control line is provided which can be used to indicate if a second connector (or more usefully, a device to which such a second connector may be coupled) is connected at all.

Preferably, the first data connector and the first power connector are provided on a connector dongle. The use of a dongle or adapter enables that a conventional disk drive in a carrier or indeed any device to be connected in this way can be adapted so as to be able to wirelessly connect for both power and data transfer. The second data connector and the second power connector may also (or instead) be provided on a connector dongle.

According to a second aspect of the present invention, there is provided an electro-optical connector, wherein the connector comprises a data connector for communicating data between a first device and a second device and a power connector for power transfer between the first device and the second device, wherein the power connector comprises a wireless power coupler and the data transfer comprises an optical free space data transfer coupler.

An electro-optical connector is provided that enables a device to which the connector is fitted or coupled to be connected to another such wireless power and data connected device. As in the first aspect, typically this would find use in a connector for a hard disk drive within a storage system and could be arranged such as to provide the connectivity between a hard disk drive (optionally in a carrier) and mid- or back plane within the storage system. The connector could be an integrated part of the disk drive or its housing or be provided on a separate dangle or application specific PCB coupled to the disk drive or its housing or carrier. Again, the connector is effectively a contactless connector in that in use there would be no direct physical contact between either the power transfer or data transfer connectors and corresponding connectors which they would connect with in use.

A hard disk drive to which the dongle might be fitted would therefore be vibrationally isolated through the power and data connectors.

Preferably, the wireless power coupler comprises a first inductive power coupler coil provided on the first device for engagement, in use, with a corresponding second coil on the second device.

Preferably, one or both of the first and second coupler coils have a shock absorbing material layer to engage with the other coil.

Preferably, the first coupler coil has a spacing including air such that, in use, there is only air between the first coupler coil and the second coil.

Preferably, the optical free space data coupler comprises an optical waveguide terminating in a beam expander to generate an expanded output beam from the waveguide.

Preferably, the electro-optical connector comprises plural waveguides, each of which terminates in a beam expander to generate a corresponding expanded output beam from the waveguide.

Preferably, the plural beam expanders are provided by an integrated lens array.

Preferably, the integrated lens array comprises a geometric or GRIN microlens array.

Preferably, the electro-optical connector comprises an optical engine having one or more optical sources for generating optical signals.

Preferably, the electro-optical connector comprises one or more waveguides each arranged to couple optical signals from the optical engine to an edge region of the connector.

Preferably, the optical engine has one or more optical receivers for receiving optical signals from another connector.

Preferably, the electro-optical connector comprises a static control line to indicate the presence of a second connector.

According to a third aspect of the present invention, there is provided a disk drive connector for a disk drive within a storage system, wherein the connector comprises a data connector for communicating data between a disk drive and the storage system and a power connector for providing power transfer between the storage system and the disk drive, wherein the power connector comprises a wireless power coupler and the data transfer comprises free space data transfer such that in combination the power and data coupling between the disk drive and the storage system is contactless.

An electro-optical connector for disk drive is provided that enables a hard disk drive to which the connector is fitted or coupled to be connected to another such wireless power and data connected device. In the case of a storage system including a mid- or back plane, the connector would connect with another corresponding connector meaning the disk drive would not be vibrationally coupled to the mid- or back plane through the connector. Since such connections, in conventional system enclosures are the primary source of vibrational noise, the connector is of significant benefit in these applications. This advantage becomes even more significant as the density of storage devices increases as increased density of storage devices necessarily means that there would be more devices within a unit volume in a storage system and therefore the potential for even greater vibrational noise. An increase in storage device density could for example come about through the continuing trend of disk drive form factor reduction. The most prominent example of this trend would be the increasing adoption of 2.5" hard disk drives over 3.5" hard disk drives.

According to a fourth aspect of the present invention, there is provided a method of connecting a first device to second device using an electro-optical connector assembly, the method comprising providing a first optical data connector on a first device and a second optical data connector on a second device, communicating data through free space between the first device and the second device with the first and second optical data connectors; and, providing first and second power connectors for arrangement on the said first and second devices respectively, and wirelessly providing power to the first device from the second device with the first and second power connectors.

Preferably, the first device is a storage device and the second device is a storage system midplane.

Embodiments of the present invention will now be described in detail with reference to the accompanying drawings, in which:

DETAILED DESCRIPTION

Figure 1:
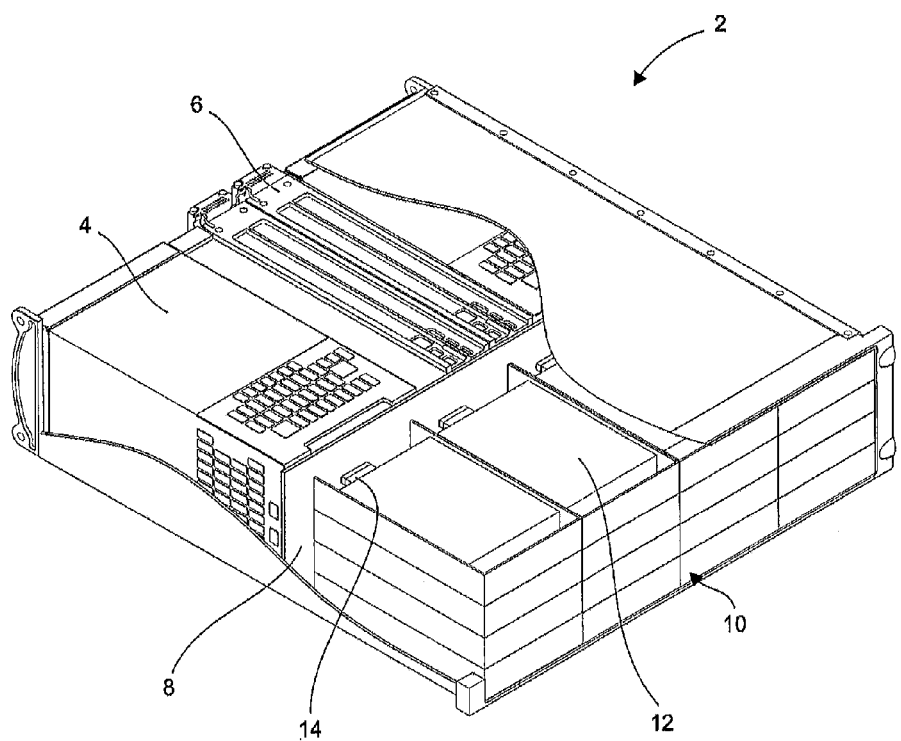
FIG. 1 shows a schematic representation of a storage system enclosure.

FIG. 1 is a schematic representation of a data storage enclosure 2 which may be provided within a data storage system. The enclosure 2 is typically dimensioned to fit within a larger storage server rack including several such enclosures. However, it will be appreciated that any type of storage enclosure could be used.

The enclosure could, for example, be a Storage Bridge Bay compliant enclosure and include various controllers and input/output units 4 and 6 coupled to a midplane 8. Plural storage media are provided in slots 10 at the front of the enclosure 2. Each carrier comprises a disk drive 12 which is coupled to the midplane 8 via connectors 14. As explained above, these connectors in a conventional system are the source of significant vibrational noise transmission from one disk drive to another disk drive and to the system as a whole. Typically one disk drive whilst operating will pass vibrations through its connectors, via the midplane and through the connectors of a second disk drive to that disk drive. Similarly, a disk drive can receive vibrations from the midplane via its connectors 14.

Figure 2:
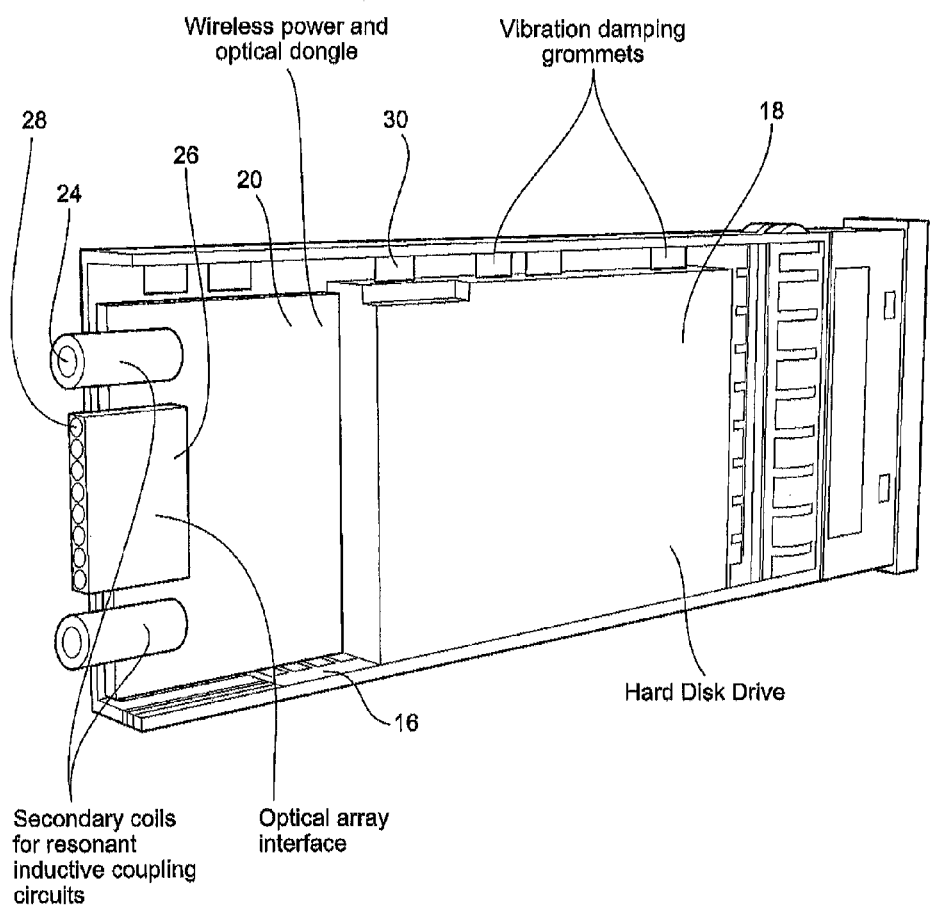
FIG. 2 shows a schematic representation of a disk drive carrier for use in a storage or test system.

FIG. 2 is a schematic representation of a carrier 16 for a disk drive 18. A wireless power and optical dongle 20 is provided to be described in detail below. The dongle 20 provides a mechanically contactless power and high speed signal interface for the disk drive 18 to a midplane within a storage enclosure such as that shown in FIG. 1. The dongle or mechanically contactless power and high speed signal interface may be used for any pluggable electronic module susceptible to vibration from the system within which it is arranged or which themselves can serve as a vibration source into the system, impeding the performance of other modules or components in the same system. The description herein will relate predominantly to reduction of the vibration coupling in storage systems including hard disk drives. However, it will be understood that the scope of the system is not so limited.

The power and optical dongle 20 provide wireless power conduits which are typically based on magnetic induction schemes such as resonant inductive coupling, whilst the high speed signal interfaces are provided through free space optical transmission. Thus, the main mechanical conduits of performance reducing vibration to and from the storage media are removed.

FIG. 2, in more detail, comprises coils 24 forming part of the wireless power and optical dongle 20. The coils may be thought of as secondary coils since they are arranged in use to engage with "primary" coils (not shown in FIG. 2) on a system mid- or backplane. The system can be a storage system and/or a disk drive or storage medium test system. Wireless interaction between the coil on the backplane and the coil 24 on the dongle serve to enable power transfer between the two without direct physical contact. In addition, an optical array interface 26 is provided having optical outlet regions 28 which can be used to couple optical signals with a corresponding receiver or transmitter on a system backplane.

In the example shown, optical and inductive coupling circuits are provided as part of the dongle 20. It will be appreciated that the secondary coils 24 and the optical array interface 26 can be provided as an integrated part of the electronic device. Indeed, in some examples, the electronic devices, which may be hard disk drives 18, comprise inductive coupling circuits and an optical array interface as part of their housing.

In the example shown in FIG. 2, vibration damping grommets 30 are provided which serve to provide some physical support for the disk drive 18 within the carrier 16 whilst still providing a degree of vibrational isolation between the disk drive and the carrier. The disk drive is therefore neither entirely unsupported nor rigidly coupled to or within the carrier.

It will be understood that complete mechanical isolation of a disk drive, e.g. through levitation, is not desirable as the drive could start to oscillate unpredictably due to the movements of the internal actuators during operation. The magnitude of the oscillations can be of the order of centimeters. This phenomenon, known as self-excitation, requires some level of mechanical tethering of the drive. In the example shown in FIG. 2, this is provided by the grommets 30 formed of a material of suitable hardness deemed to provide optimum vibration reduction or isolation between the drive and its carrier, whilst minimising oscillations due to self-excitation.

The coils 24 forming part of the dongle 20 are one means by which wireless power transfer can be achieved. Typically, in such a configuration, a primary coil pod is provided on a docking station, e.g. the midplane, and an annular secondary coil is provided on the dongle 20. Modern advances in these technologies include, in particular, resonant inductive coupling, whereby the RLC circuits to which the primary and secondary coils are attached, are tuned to the same resonant frequency. This significantly increases power coupling efficiency.

In the present system, a contactless wireless power coupling plug and receptacle are provided whereby the plug or primary coil is smaller than the inner surface of the secondary coil 24 or capturing receptacle by an amount sufficient to still enable efficient power coupling. In preferred examples, there is between one and eight millimeters of play between the two. If a resonant inductive coupling system is used, a significant degree of play will be possible while still enabling a good coupling to be achieved. Indeed, if resonant magnetic coupling is used, the shape of the primary and secondary devices need not be restricted to the typical pod and annulus convention. Due to the efficiency of resonant magnetic coupling, energy transfer between the primary and secondary magnetic coils can occur over distances larger than the devices themselves and even around obstructing objects between the primary and secondary coils. The primary and secondary devices can thus be embedded into structures or shapes better suited to the design and space constraints of the environment in question.

This means, for example, that a primary coil need not be situated in the immediate vicinity of the power receiving device. It could be situated on the midplane, backplane, motherboard or source device anywhere in the system (within the effective radius). Multiple power receiving devices could be serviced by one primary device. So for instance, multiple disk drives can be housed in one drive carrier without the need for the power receiving elements to be in the immediate vicinity of the midplane or backplane to which the drive carriers are attached. This opens up new design possibilities allowing new arrangements of disk drives within data storage systems and high data storage densities.

There would still of course be a need for line-of-sight to an optical interface, however, these can be easily accommodated by alternative optical interface arrangements.

In a preferred embodiment, there is no material in the gap between the primary coil pod and the inner surface of the secondary coil annulus 24. In other words, there is free space between the two without any other substance (other than air or some other gas) being provided within it.

In a different embodiment, this space is filled with a vibration damping material such as an EAR material with parameters tuned to minimize the transfer of vibrational energy. EAR materials are vibration absorbing materials manufactured by Aearo Technologies, a 3M company based in Indianapolis, US. Details of such materials can be found in http://www.earsc.com/pdfs/Dampingeffectsl-inHDD.pdf, the entire contents of which are hereby incorporated by reference. The EAR material in such an example would be the only conduit of mechanical vibrational energy related to the power and data connection between the disk drive and the system. The system may in fact be considered to include everything outside the drive, including for example everything external to the enclosure i.e. the rest of the universe. This is important as the present connector assemblies could be deployed in environments prone to strong vibrations (e.g., aircraft, military vehicles, areas prone to seismic activity (e.g., in Japan, California), etc.), which must nonetheless retain high levels of data storage performance throughout. Furthermore, EAR grommets (e.g., shown in FIG. 2), which may be used to support the disk drive within the storage system, are the only conduit of mechanical vibrational energy between the disk drive and the system (again defined as everything outside the drive).

The material will not interfere with the efficiency of power coupling and is essentially transparent to the power coupling. Such an arrangement is preferable since it provides additional alignment accuracy. In a particular example, a low friction coating is provided on one or both of the inner surface of the secondary coil annulus and the outer surface of the primary coil pod. This enables a low friction interaction to be achieved between the two upon engagement.

The dongle or connector assembly is provided as a unitary device or adapter which enables both data and power transfer. Such an arrangement is simple to use. Engagement between a disk drive including such a connector assembly and a corresponding mid- or back plane is straightforward since a single "plug" includes both the power and data transfer functionality. The power and data transfer components are preferably at fixed relative locations to ensure engagement of one when the other is engaged. In other words, once the power couplers are engaged the optical interface will automatically be engaged too.

Figure 3A:
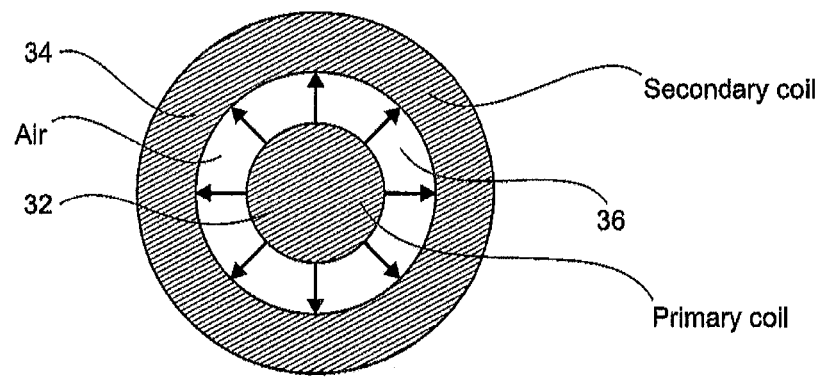
FIGS. 3A to 3C are schematic representations of resonant inductive coupling parts for use in a disk drive connector.
Figure 3B:
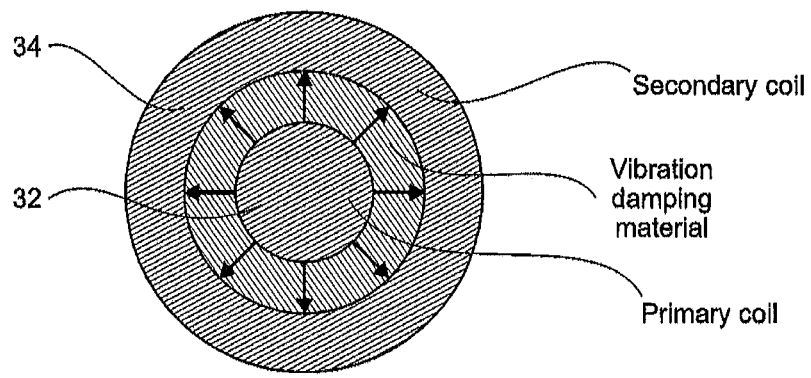
Figure 3C:
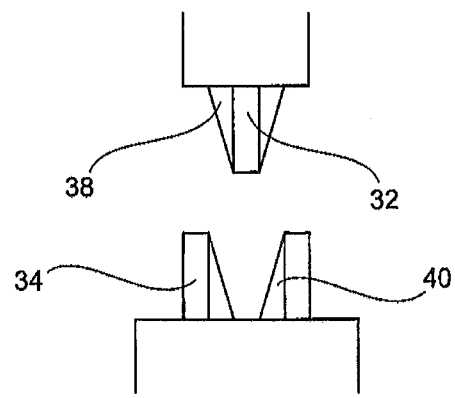

FIGS. 3A and 3B show two particular examples of primary and secondary coils for use in a resonant inductive coupling. In one example, a primary coil 32 is provided on a backplane (not shown). The secondary coil 34 is sized to receive the primary coil 32 upon engagement. A cylindrical or annular region 36 is defined between the primary coil and the secondary coil which, in the example of FIG. 3A is filled with air. In the example of FIG. 3B, the space between the primary coil 32 and the secondary coil 34 has a vibration damping material within it. This can be provided on one or both of the primary and secondary coils. In one preferred example, as shown in cross-section in FIG. 3C, the arrangement of the vibration damping material is tapered on one or both of the coils such as to enable an easy fit between the two. This is shown in one particular example in FIG. 3C which shows a tapered region of vibration damping material 38 provided on the primary coil 32 and a corresponding region 40 of tapered vibration damping material 40 on the secondary coil 34.

In one embodiment, one, two or more primary (transmitting) coil pods and power supply circuits would be housed on the backplane, midplane or motherboard or otherwise, to which the drive is connected, or, preferably a removable interposer would be attached to the midplane, the primary coil being coupled to the interposer.

Figure 4A:
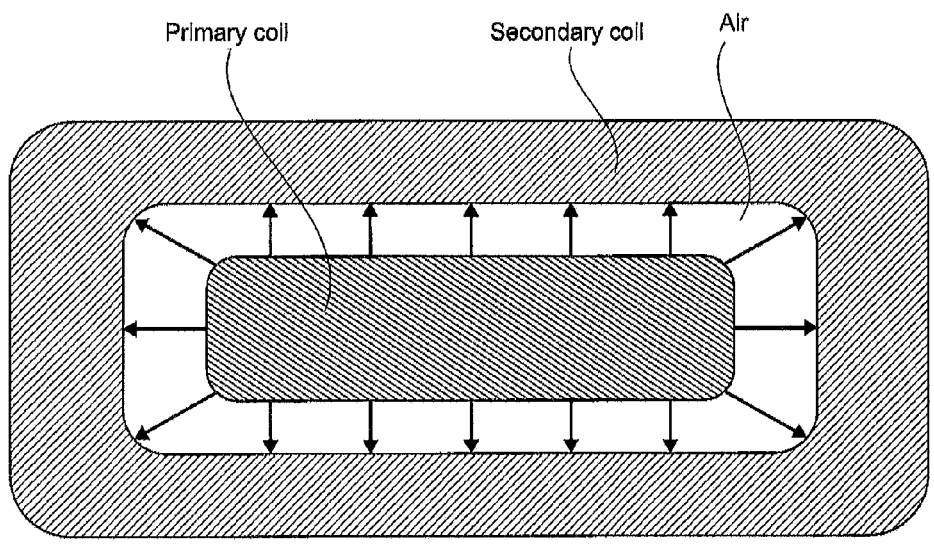
FIGS. 4A and 4B are further examples of resonant inductive coupling parts for use in a disk drive connector.
Figure 4B:
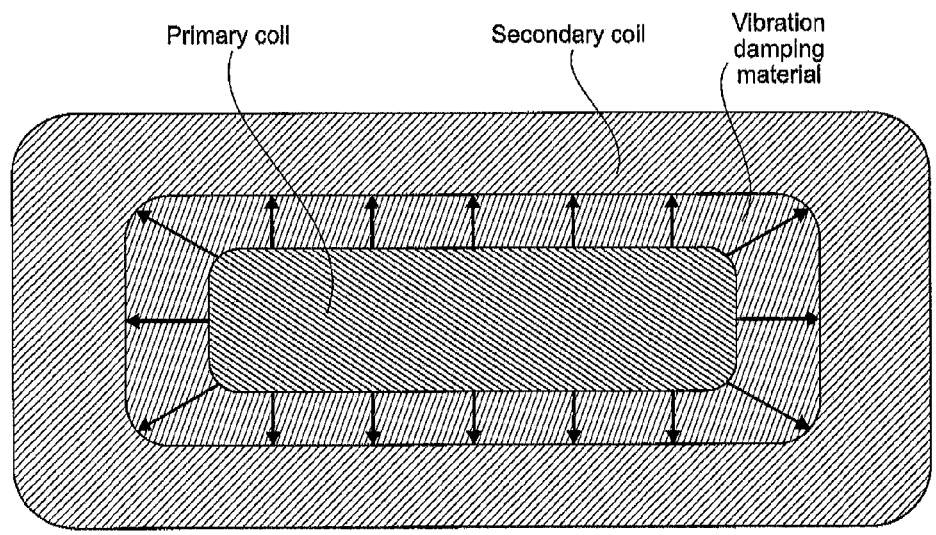

FIG. 4 shows two further examples in which the primary and secondary coils are not circular, but rather are substantially rectangular. Again, in one of the examples (FIG. 4A), air is provided between the primary and secondary coils whereas in the other (FIG. 4B), vibration damping material is provided. Again, the vibration damping material may be provided on either or both of the coils and again could be provided in a tapered configuration.

Figure 5:
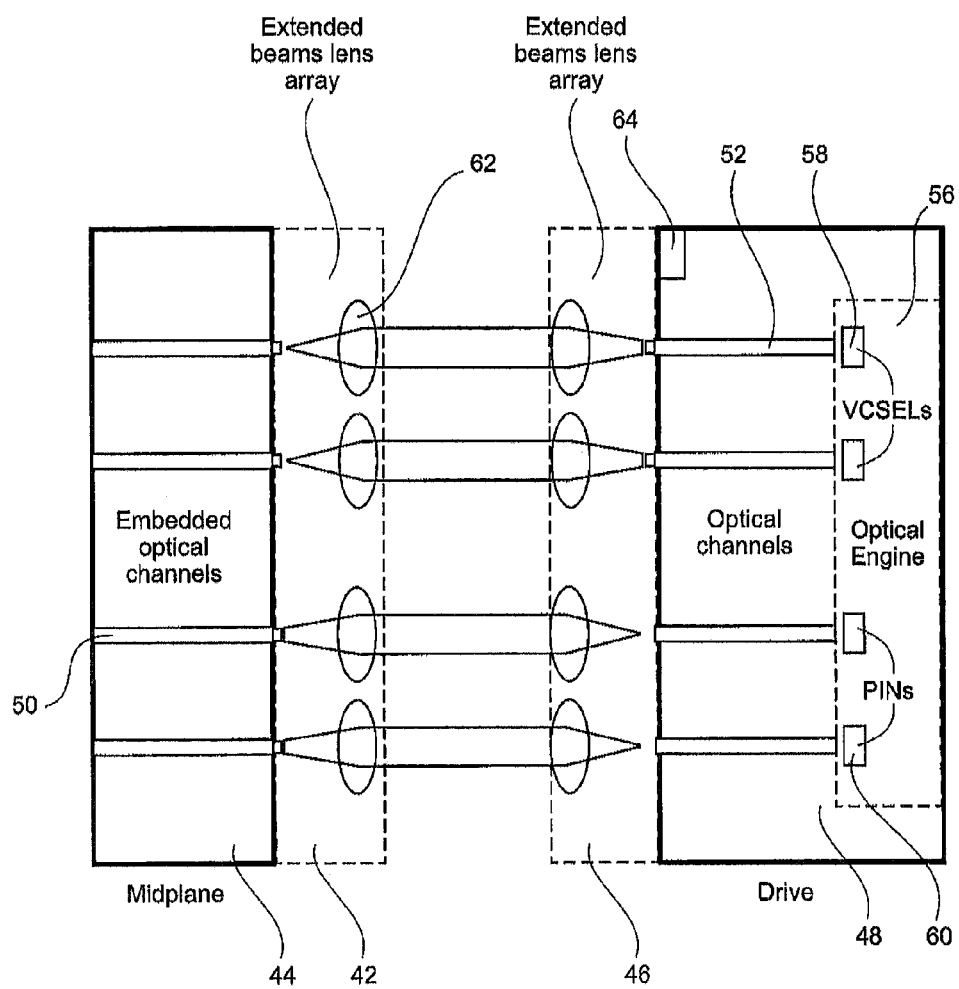
FIG. 5 is a schematic representation of a 2+2 free-space optical connector.

FIG. 5 shows a schematic representation of a 2+2 expanded beam interface, for use in high speed data coupling. This is one mechanism by which free space optical data coupling can be provided. In a known high speed data connector, electromechanical contacts to the drive are provided. In known high speed optical data connectors, optical interfaces are typically butt-coupled to enable signal transfer and communication. In the present system, the conventional electronic high speed signal lines are removed, as is any other form of direct contact within the data connector. This is achieved by providing a free space optical array, whereby a beam expanded lens array is deployed on both the drive and midplane sides.

The free space optical coupling or beam interface of FIG. 5 comprises a first expanded beam lens array 42 provided on the midplane, backplane or motherboard 44 and a second expanded beam lens array 46 provided on the hard disk drive 48. In the example shown, the beam lens array 46 is shown coupled directly to the drive 48 although it will be appreciated that, as described above, it could be provided as part of a dongle, such as the dongle 20 shown in FIG. 2, for coupling to the drive.

Optical channels 50 are provided on the midplane 44 and channels 52 are provided on the drive or dongle 48. The optical channels 50 and 52 may be of any appropriate form, including optical fibres or embedded polymer or glass waveguides. On the drive-side of the assembly, the optical channels 52 couple to an optical engine 56 which includes optical transmitters 58 and optical receivers 60. The optical transmitters, in this example, are vertical cavity surface emitting lasers (VCSELs) and the optical receivers are PIN diodes. It is preferred that the optical engine is provided as close as possible to the data signal source on the disk drive 48 so as to minimise the length of copper traces required for coupling signals. At higher signal frequencies, copper traces can be excessively lossy which is undesirable. The use of an optical engine 56 together with optical channels 52 enables the length of copper signal carriers to be minimised. It will also be appreciated that optical data transfer has the advantage over other forms of wireless data transfer (such as Bluetooth) that it can accommodate much higher data rates.

The optical engine 56 serves to convert electronic signals from the disk drive into optical signals for onward propagation along the optical channels 52 from the transmitters 58. In reverse, the optical receivers 60 serve to receive optical signal inputs from the optical channels 52 and convert these into electrical signals for onward propagation to the disk drive.

On the other side of the assembly, the midplane 44 includes embedded optical channels 50 which serve to carry the optical signals to or from the interface provided by the expanded beam lens array 42. The optical channels typically lead to a passive optical connector as typically there would be no active devices in the signal path on a non-field-replaceable midplane, and preferably onward to another optical PCB connected to the optical midplane. The other optical PCB may be one such as a data storage controller board providing an expander (in the case of SAS) or another type of processing complex, which regulates the high speed links to the drives in the data storage array. In this example, there is of course the option of providing a further optical engine or optical conversion capability in or near the processing complex again so as to minimize the required length of copper communication channels on the midplane 44.

Referring to the beam arrays 42 and 46, a plurality of optical components 62 are provided. In the example shown these are collimating lenses which serve to expand optical signals from optical channels out to the connecting plane or focus received optical signals down to couple to optical channels.

The expansion factor of the lenses should be large enough to ensure that the collimated free space optical signal transmitted from one lens is captured by the received lens. The factor by which the beam must be expanded will be determined by the tolerance or play that the wireless connector pods will require. Preferably the play is as small as possible whilst ensuring that no mechanical contact is made during normal operation between the wireless power connectors. An advantage of a large expanded optical beam is that it is less sensitive to contaminants which are typical in a forced air enclosure.

So as to further reduce the risk of contamination of the optical lenses, the lens arrays can be fitted with dust shields (not shown) that open when the drive is inserted and the two interfaces are brought as close together as required. The mechanism which levers the dust shields to open will preferably not be directly mechanically attached to the disk drive interface system otherwise it would present a new conduit of vibrational energy to and from the drive. Preferably it would be part of the disk drive carrier instead, which is mechanically isolated from the vibration sensitive disk drive through appropriate vibration damping structures.

Typically, the expanded beam lens array could be of a dimension as wide as one to three millimeters. The separation of the optical sources 58 or receivers 60 would typically range from 250 microns up to 10 millimeters. Clearly, the separation of the optical sources places a limit on the width that the expanded beam can adopt.

The number of high speed channels provided in the connector can be scaled up as required. For a multilink SAS or PCIe drive interface, which supports four duplex links, there would need to be eight lenses (four transmitting and four receiving) and corresponding optical transceiver support.

The optical lenses could be provided as formed geometric optical components within a housing or some such mounting. The use of such geometric optical components has the advantage that they are low cost and easy to manufacture, e.g. using injection moulding. In an alternative, the optical lenses could be provided as GRIN lenses within a unitary optical block. For example by varying the refractive index profile of an optical block in appropriate dimensions, the required lensing capability can be introduced to the material at desired positions.

An optically-transparent index-matching glue would be provided between the midplane and drive and the respective expanded beam lens arrays 42 and 46.

By providing such an optical interface, in combination with the contact-less power coupling described above, the main sources of vibration transfer between an electronic device such as a disk drive and a system in which it is arranged can be reduced or even avoided entirely.

It may also be desirable to provide means for accommodating static and low speed control signals. In the example of FIG. 5, an optical transmitter 64 such as an LED is provided. The low cost LED 64 is provided on the drive 48 or dongle such that when it is plugged in, in close proximity (but of course not in mechanical contact) to a corresponding sensor (not shown) on a midplane 44, a low speed control signal can be conveyed. Indeed, one or more LEDs and corresponding sensors can be used to provide a bidirectional low speed optical channel between the electro-optical drive or electronic component and midplane interposers. To save cost, the static presence LEO and sensor can double as providing such a bidirectional low speed communication channel. Such low speed signal transmission could alternatively be done with other wireless data transfer schemes such as Bluetooth. However, the use of a simple LED and receiver is low cost and efficient.

The incorporation of the mechanically contactless electro-optical drive interface described herein within a data storage enclosure will significantly improve performance of the drives therein and their expected lifetimes. This will be especially true of magnetic drives based on bit density enhancing technologies such as thermally assisted recording or bit patterned media, the performance of which is expected to be more sensitive to vibration than conventional technologies.

Figure 6:
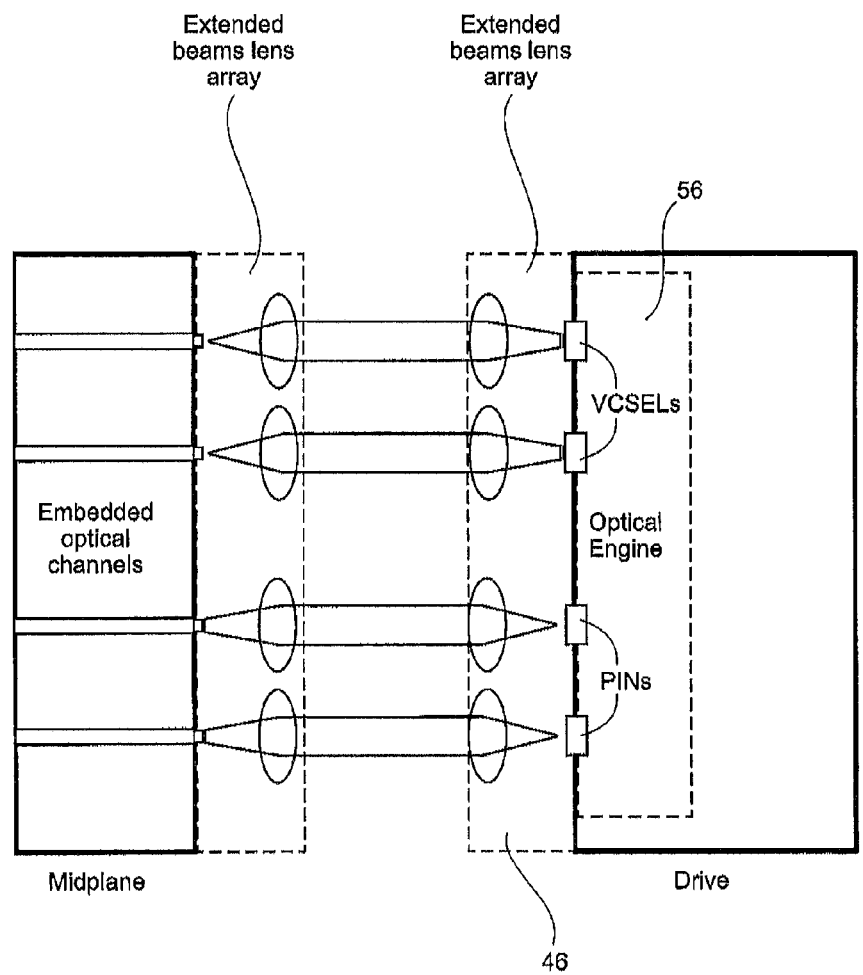
FIG. 6 is a schematic representation of a free-space expanded beam connection interface between a midplane and disk drive (or drive dangle) in which an optical transceiver is directly connected to a lens array.

FIG. 6 shows a further example of a non-contact optical interface. The arrangement is similar to that of FIG. 5, except in this case the optical engine 56 is coupled directly to the lens array 46. In other words, there is no need for optical channels 52 such as provided in FIG. 5 to communicate optical signals between the optical engine 56 and the lens array 46.

Figure 7:
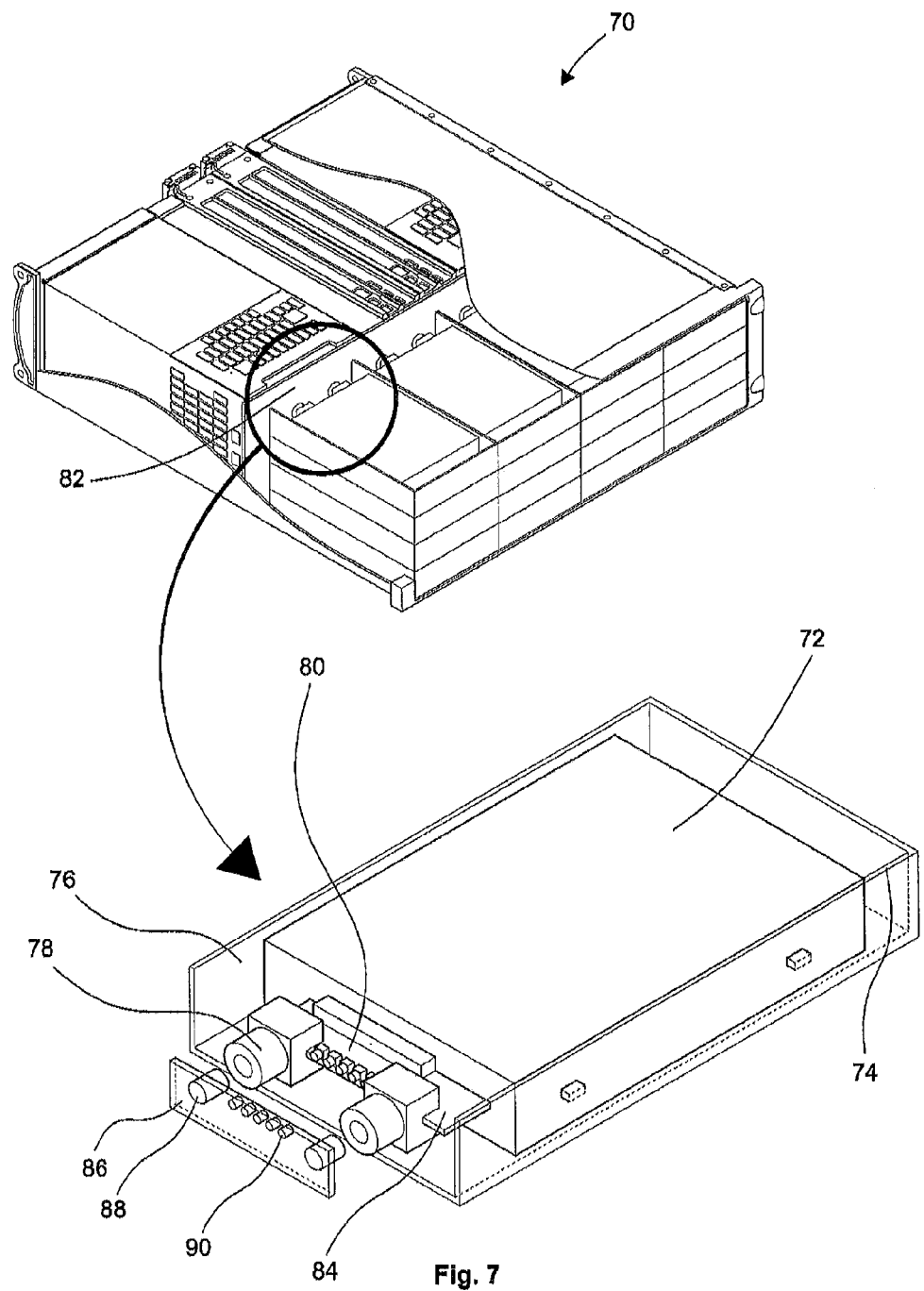
FIG. 7 is a schematic representation of a data storage enclosure accommodating a contactless drive connector.

FIG. 7 shows a schematic representation of a storage enclosure 70 including plural storage media 72 in the form of disk drives arranged within carriers 74. Each is arranged within a slot in the storage enclosure 70 and is provided with a wireless power and data connector assembly 76. The connector assembly 76 could be of the type described above and includes wireless power couplers 78 and an optical interface 80. In use, the disk drives in their carriers 74 are connected to a midplane 82, such that the interface with the midplane is contact-less in the manner described above. Thus, any vibrations caused by the rotation of the media within the disk drive 72, will not be transmitted to the midplane 82 and therefore onwards to other components within the enclosure 70. The carriers are of course supported in the enclosure 70 by some appropriate means which enables the contactless engagement of the disk drives they support with the midplane to be achieved. For example, they could be held within a frame defining the slots or suspended from rails. Indeed, typically within a storage enclosure or system there are provided frames or guiding structures to support and guide the drive carriers.

In the example shown in FIG. 7, the interface 80 is provided on a dongle 84 although the interface could be integrated with the disk drive 72, as mentioned above.

To engage with the interface 80, a connector 86 is coupled to the midplane 82. As can be seen, the connector 86 includes power couplers 88 and one or more optical components 90 to enable transmission and receipt of optical signals as described above.

The presence of an optical lens array so as to expand the beams is clearly preferred since it enables a greater degree of play between the two parts of a connector assembly. However the connector can be provided without the lens arrays so long as the alignment between the optical transmitters on one part of the connector assembly and receivers on the other is sufficiently accurate.

In a preferred embodiment of the invention, the interposer or dangle on the drive side incorporates both a resonant inductive power supply circuit, a mid board mountable optical transceiver device (an optical engine) and an expander beam lens array attached to the optical transceiver, either directly or via an intermediary optical channels, to provide optical links to and from an electro-optical midplane. The midplane would, in turn, contain embedded optical links, e.g. provided by fibres, waveguides (polymer or glass) as is well known. These optical channels would be terminated on the drive side by another expanded beam lens array.

In the case of a test system, the present connector or connector assembly is particularly advantageous. It provides a means by which drives under test can be further isolated from the test system itself. Such a system can contain thousands of drives, drive test cells, moving gantries, fans and other sources of vibration. Each drive test cell is preferably provided with a wireless power transmitter as described herein. For example, each may be provided with a primary coil for resonant inductive coupling and a free space expanded beam parallel optical interface to both power and communicate with an attached disk drive without any mechanical contact across the power/communications interface.

In this case, as in the examples above, some minimal mechanical support is required to prevent movement of the drive itself due to self-excitation. Again, such mechanical support between the drive and the test system, i.e. a carrier containing the drive under test, can be provided by the use of vibration damping materials, such as EAR materials. As in the example of a storage system, grommets may be used to mount the drive within a test carrier. The description above of a storage system applies correspondingly in that the carrier may have a cassette form and be arranged to support the drive within a slot in a test system. Examples of test systems of the present assignee in which the present connector assembly may be used include the Optimus, XCalibre and Xman disk drive processing test systems.

Figure 8:
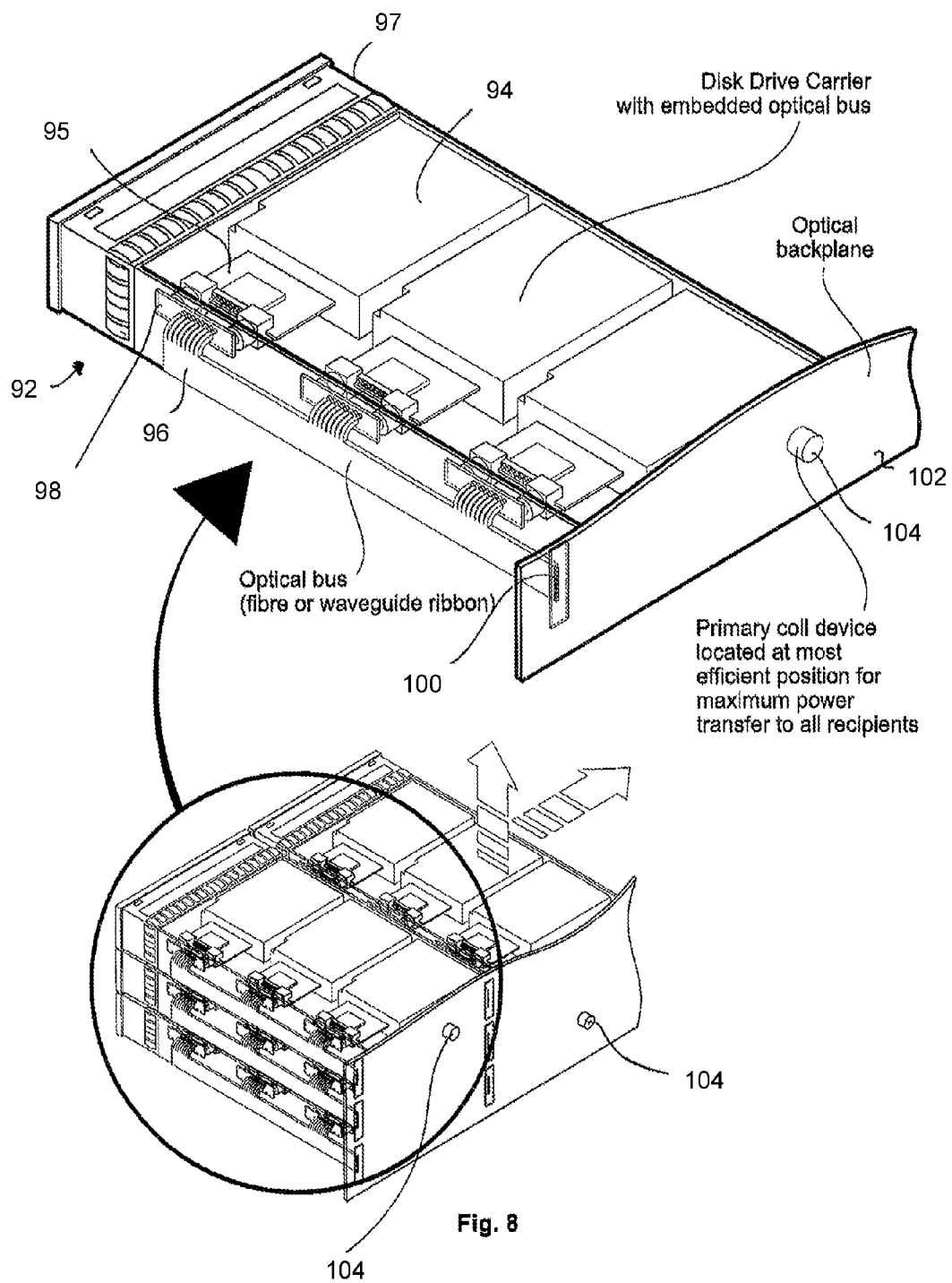
FIG. 8 is a schematic representation of a disk drive carrier including plural disk drives wirelessly connected to a backplane.

FIG. 8 is an example of a part of a storage system in which carriers 92 are provided, each containing plural disk drives 94. In this example, a dongle 95 is connected to each of the disk drives 94 and includes input and output interfaces 98. The disk drive carrier 92 has a housing 97 including an embedded optical bus 96. The embedded optical bus 96 has plural input and output interfaces 98 arranged to correspond to the position of disk drives 94 within the carrier 92. The connection of the disk drives to their respective interface 98 on the embedded optical bus is via a free-space optical connection similar to that described above with reference to, say, FIGS. 5 and 6. In other words, there is no direct physical contact between the parts of the input and output interfaces 98 arranged in the carrier 92 (on the bus) and those coupled to the disk drives 94 or their dongles 95.

The optical bus 96 includes optical channels which terminate at an end point 100 for interface with a corresponding optical connector on the optical backplane 102. Thus, data can be transferred in a controlled and reliable manner between each of the disk drives 94 and any other component using known routing means provided as part of the storage system.

To power the disk drives 94, a wireless power transfer device is used. A primary coil device 104 is provided and secondary coil devices (not shown) are provided on each of the dongles 95. The wireless power transfer device could be of a type described above with reference to any of, say, FIGS. 2 to 4. However since the carrier 92 contains plural disk drives and the power transfer is wireless in nature, it is possible that instead of having a direct one-to-one relationship between the primary coil device and secondary coil devices on the dongles, a shared primary coil device can be provided to couple power to plural secondary power devices associated with each of the plural disk drives in the carrier 92. The primary coil device 104 is therefore provided on the backplane 102. The primary coil device serves to transfer power to corresponding secondary coil devices arranged on each of the disk drive dongles. The primary coil device 104 is located at a convenient position which is selected so as to be most efficient position to ensure maximum power transfer to all recipients.

Figure 10A:
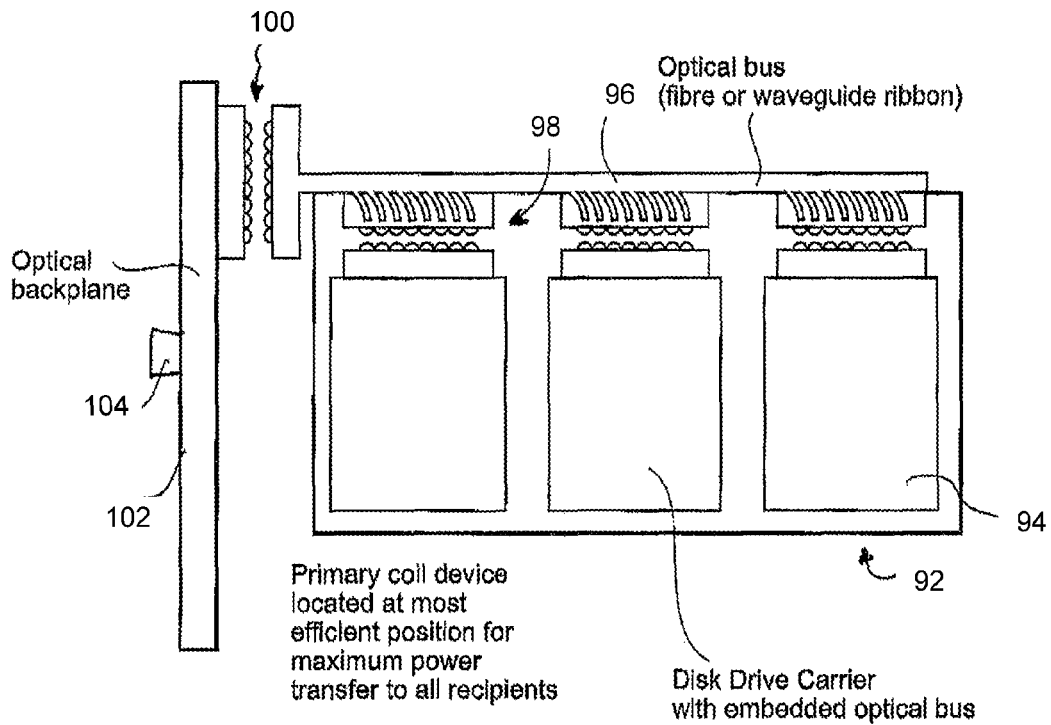
FIGS. 10A and 10B are schematic plan views of the arrangements of FIGS. 8 and 9, respectively.

The engagement between the components of the optical connector 100 is seen schematically in FIG. 10A as a non-contact interface similar to that of FIG. 5 or 6. This ensures that there is no means for transfer of vibration between the carrier 92 and the backplane 102 via the interface. Similarly, since the power transfer from the coil 104 to the corresponding coils (not shown in FIG. 10A) on the disk drives is also contactless, this also is removed as a means for possible transfer of vibrations.

As in the example of FIG. 7, the carriers may of course be supported within their enclosures by some appropriate means which enables the contactless engagement of the carrier with the optical backplane 102. Again, they could be held within a frame defining slots or suspended from rails in an appropriate manner.

Figure 9:
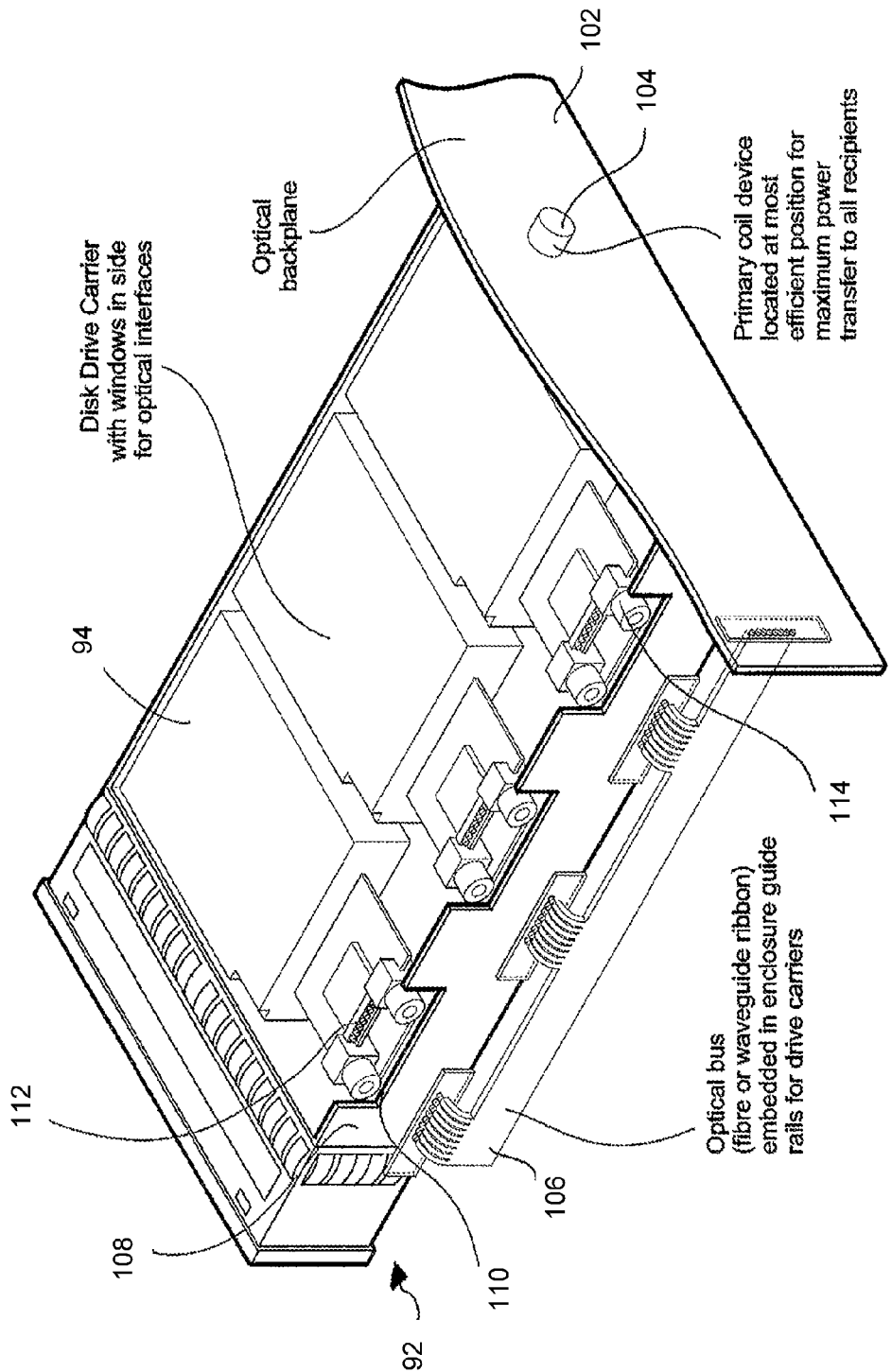
FIG. 9 is a further example of a disk drive carrier having plural disk drives wirelessly connected to a backplane.

FIG. 9 shows a further example of a disk drive carrier 92 containing plural disk drives 94. The arrangement of FIG. 9 is similar to that of FIG. 8, except that in this case, the carrier does not include an embedded optical bus. In this example, an optical bus 106 is provided in some fixed arrangement with the optical backplane 102. The optical bus may, for example, be embedded in an enclosure guide rail with which the carrier engages for support and arrangement within the enclosure. The carrier 92 has a side wall 108 having openings 110 defined by cut-outs in the wall 108. The openings 110 enable line-of-sight communication between the optical interface components 112 provided on the disk drives 94 (or associated dongles) and the corresponding optical interface components on the waveguide 106.

Again, a primary coil device 104 of a wireless power transfer system may be provided on the backplane 102 and corresponding secondary coil devices may be provided as part of the connector assemblies of the disk drives 94.

Figure 10B:
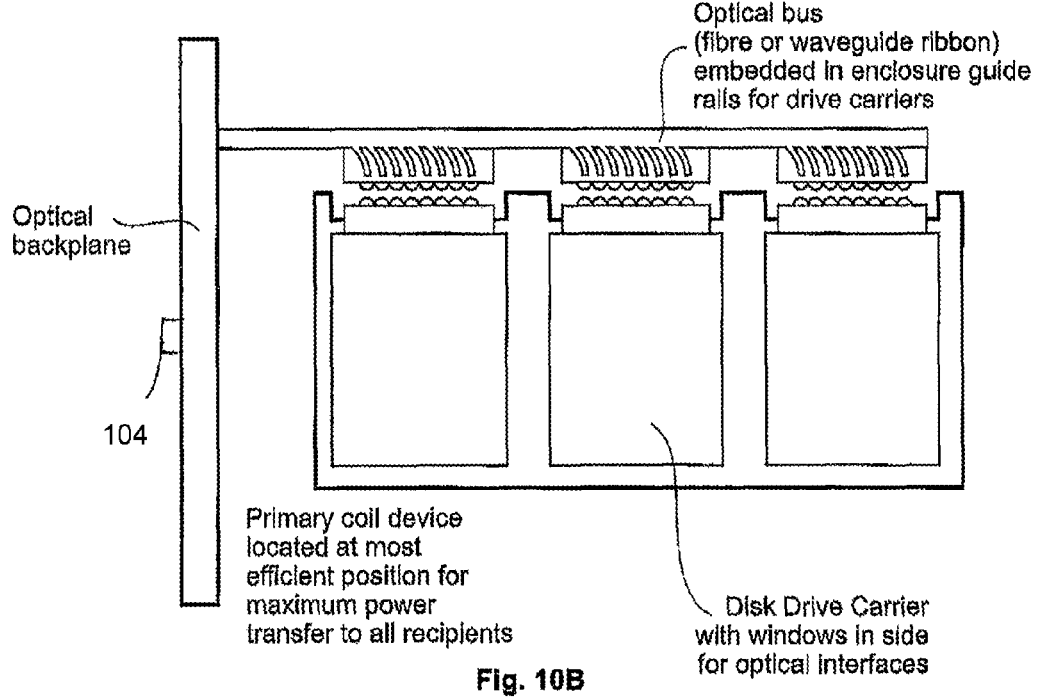

The primary coil device 104 is again located at a position determined to be the most efficient position for maximum power transfer to all recipients. In the example of FIG. 9, secondary coil devices 114 are provided on the disk drives 94 or dongles and serve to receive power from the primary coil device 104. It will be appreciated that an individual one of the disk drives 94 can be removed from the carrier 92 of either of FIG. 8 or 9 without having any effect on the remaining disk drives in the carrier. In all of FIGS. 8 to 10, it will be appreciated that the power interface or primary coil 104 does not need to be immediately adjacent the drives which it is arranged to power. Only the data interface components of the drives and the optical backplane must be in line-of-sight communication. Accordingly, the use of wireless power transfer can reduce the component count of such a system since a single primary coil can be used to provide power to plural secondary coils.

Embodiments of the present invention have been described with particular reference to the examples illustrated. However, it will be appreciated that variations and modifications may be made to the examples described within the scope of the present invention.

The invention claimed is:

1. An electro-optical connector assembly comprising:
a first optical data connector for arrangement on a first device and a second optical data connector for arrangement on a second device, the first and second optical data connectors communicating data through free space between the first device and the second device and,
a first power connector for arrangement on the first device and a second power connector for arrangement on the second device, the first and second power connectors comprising a first inductive power coupler coil and a second inductive power coupler coil, configured to receive the first inductive power coupler coil upon engagement, respectively, at least one of the first coupler coil or the second coupler coil comprising shock absorbing material, the power connectors providing wireless power transfer between the first device and the second device.

2. An electro-optical connector assembly according to claim 1, wherein the shock absorbing material has a tapered profile.

3. An electro-optical connector assembly according to claim 1, in which when the first and second coupler coils are engaged, there is a space between the coils.

4. An electro-optical connector assembly according to claim 1, in which the first coupler coil is a male coil and the second coupler coil is a female coil.

5. An electro-optical connector assembly according to claim 1, in which the first and second data connectors are optical data couplers including optical transmit and receive channels.

6. An electro-optical connector assembly according to claim 5, in which one or both of the optical data couplers comprises an optical waveguide terminating in a beam expander to generate an expanded output beam from the waveguide.

7. An electro-optical connector assembly according to claim 5, in which one or both of the optical data couplers comprises plural waveguides, each of which waveguides terminates in a beam expander to generate a corresponding expanded output beam from the waveguide.

8. An electro-optical connector assembly according to claim 7, in which the plural beam expanders are provided by an integrated lens array.

9. An electro-optical connector assembly according to claim 8, in which the integrated lens array comprises a GRIN lens array or a geometric lens array.

10. An electro-optical connector assembly according to claim 1, comprising an optical engine having one or more optical sources for generating optical signals optically coupled to at least one of the data connectors.

11. An electro-optical connector assembly according to claim 10, comprising one or more waveguides each arranged to couple optical signals from the optical engine to an edge region of the connector assembly.

12. An electro-optical connector assembly according to claim 10, in which the optical engine has one or more optical receivers for receiving optical signals from another connector.

13. An electro-optical connector assembly according to claim 1, comprising a static control line to indicate the presence of a second connector.

14. An electro-optical connector assembly according to claim 1, wherein the first data connector and the first power connector are provided on an integrated connector dongle.

15. An electro-optical connector comprising:
a data connector for communicating data between a first device and a second device, and
a power connector for power transfer between the first device and the second device, wherein the power connector comprises a wireless power coupler comprising a first inductive power coupler coil provided on the first device for engagement, in use, with a corresponding second power coupler coil on the second device, the second power coupler coil configured to be received within the first power coupler coil, at least one of the first and second coupler coils having a shock absorbing material layer to engage with the other coil, with a space including air between engaged first and second power coupler coils, and
the data connector comprises an optical free space data transfer coupler.

16. An electro-optical connector according to claim 15, in which the optical free space data coupler comprises an optical waveguide terminating in a beam expander to generate an expanded output beam from the waveguide.

17. An electro-optical connector according to claim 16, comprising plural waveguides, each of which terminates in a beam expander to generate a corresponding expanded output beam from the waveguide.

18. An electro-optical connector according to claim 17, in which the plural beam expanders are provided by an integrated lens array.

19. An electro-optical connector according to claim 18, in which the integrated lens array comprises a GRIN lens array or a geometric lens array.

20. An electro-optical connector according to claim 15, comprising an optical engine having one or more optical sources for generating optical signals.

21. An electro-optical connector according to claim 20, comprising one or more waveguides each arranged to couple optical signals from the optical engine to an edge region of the connector.

22. An electro-optical connector according to claim 20, in which the optical engine has one or more optical receivers for receiving optical signals from another connector.

23. An electro-optical connector according to claim 15, comprising a static control line to indicate the presence of a second connector.

24. A disk drive connector for a disk drive within a storage or test system, the connector comprising:
a first data connector and a second data connector for communicating data between a disk drive and the storage or test system, and
a power connector for providing power transfer between the storage or test system and the disk drive, wherein the power connector comprises a wireless power coupler and a first inductive power coupler coil on the storage or test system and a second inductive power coupler coil on the disk drive, one of the first inductive power coupler coil and the second inductive power coupler coil configured to receive therein the other of the coupler coil in use, one or both of the coupler coils having a shock absorbing material layer to engage with the other coupler coil, with a space including air between the coupler coils, and
the data connectors comprise free space data transfer such that in combination the power and data coupling between the disk drive and the storage or test system is wireless.

25. A disk drive connector according to claim 24, in which the shock absorbing material has a tapered profile.

26. A disk drive connector according to claim 24, in which the first and second data connectors are optical data couplers including optical transmit and receive channels arranged in use to transfer data between the disk drive and the storage or test system.

27. A disk drive connector according to claim 26, comprising an optical engine having one or more optical sources for generating optical signals optically coupled to at least one of the optical data couplers.

28. A disk drive connector according to claim 25, comprising a static control line to indicate the presence of a disk drive in the storage or test system.

29. A method of connecting a first device to a second device using an electro-optical connector assembly, the method comprising:
providing a first optical data connector on a first device and a second optical data connector on a second device, communicating data through free space between the first device and the second device with the first and second optical data connectors;
providing a first power connector and a second power connector for arrangement on the first and second devices respectively, each power connector comprising an inductive power coupler coil, with at least one of the coupler coils comprising shock absorbing material,
engaging one of the inductive power coupler coils within the other, and wirelessly providing power to the first device from the second device with the first and second power connectors.

30. An electro-optical assembly according to claim 1, comprising an optical engine having one or more optical sources for generating optical signals optically coupled to at least one of the data connectors.

31. A disk drive connector according to claim 24, in which the first and second data connectors are optical data couplers including optical transmit and receive channels arranged in use to transfer data between disk drive and the storage or test system.

* * * * *